M. C. ANDERSON.
REAR DUMP VEHICLE.
APPLICATION FILED JAN. 17, 1921.
1,402,730.
Patented Jan. 10, 1922.
4 SHEETS—SHEET 3.
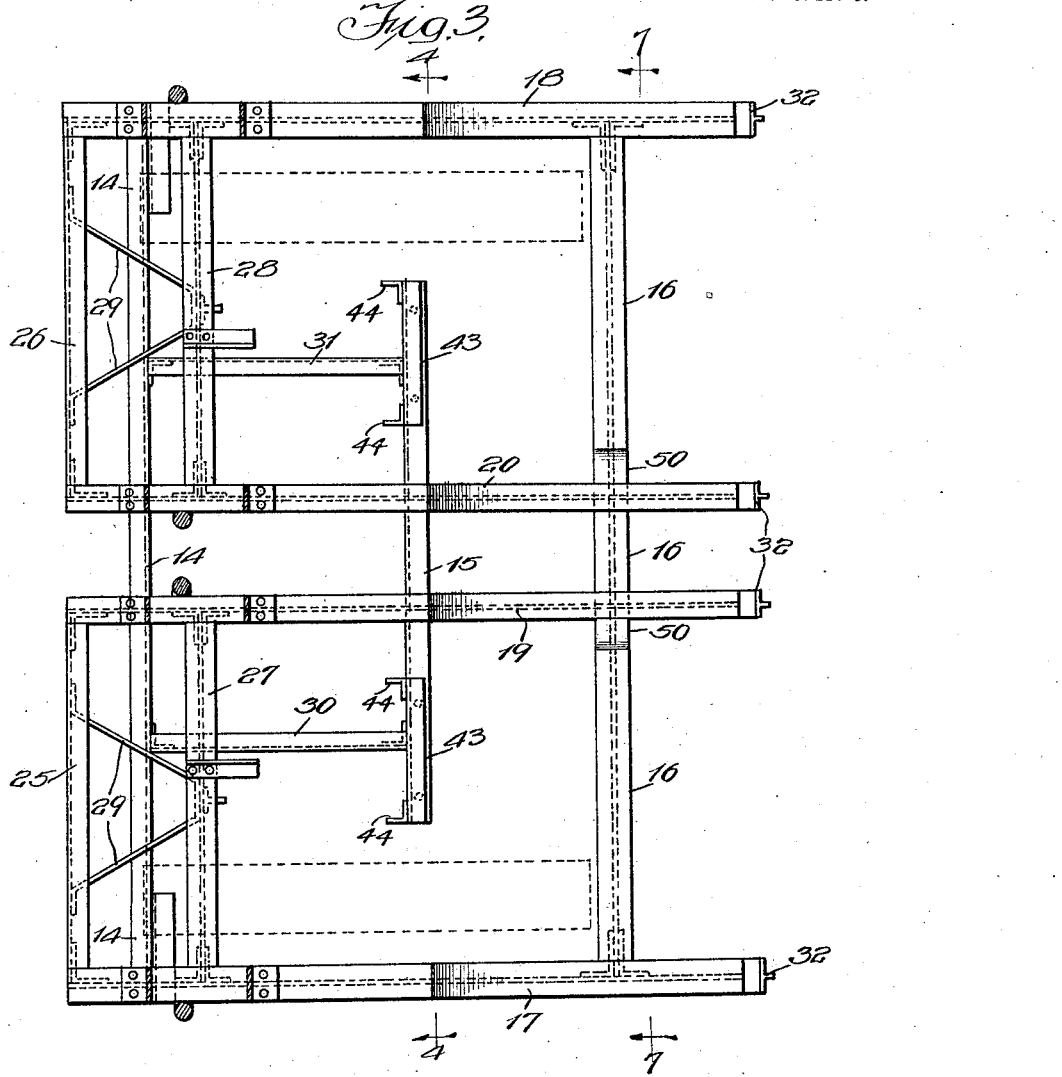
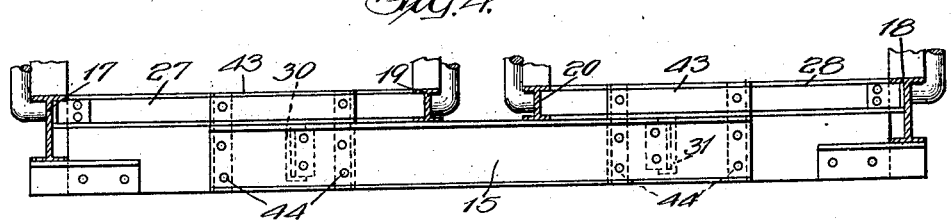
Witnesses:
W. F. Kilroy
Harry R. L. White
Inventor
Magnus C. Anderson
By Zabel & Mueller
Attys

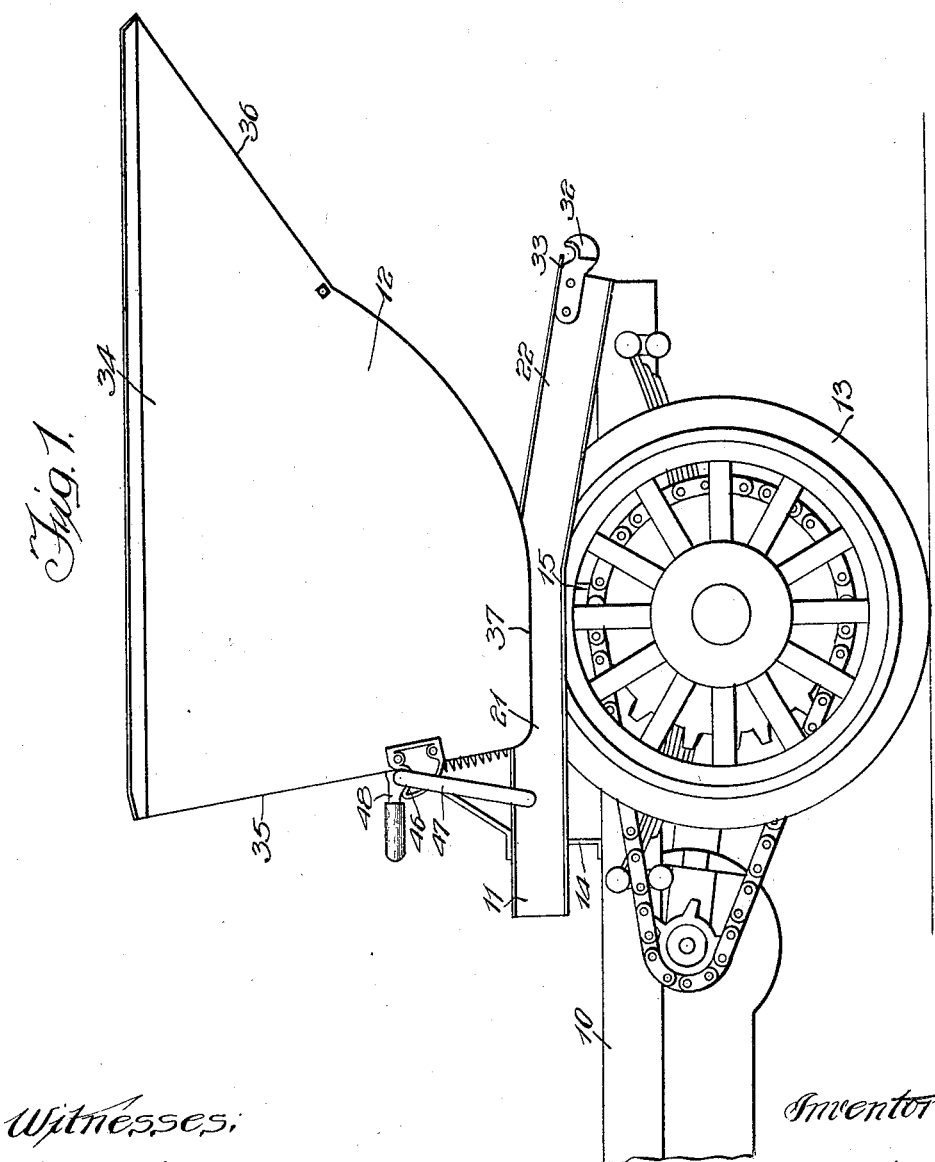

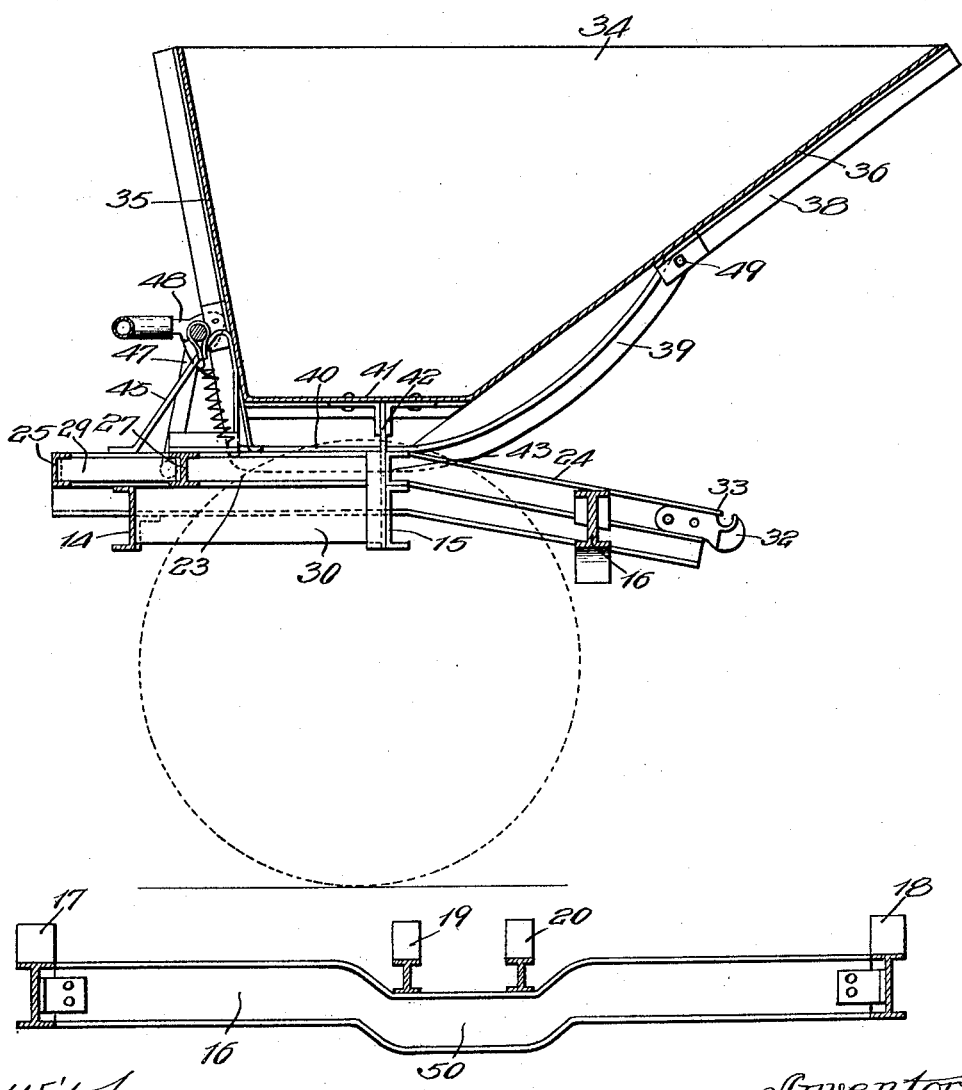

M. C. ANDERSON.
REAR DUMP VEHICLE.
APPLICATION FILED JAN. 17, 1921.

1,402,730.

Patented Jan. 10, 1922.
4 SHEETS—SHEET 4.

Witnesses:
W. F. Kilroy
Harry R. L. White

Inventor:
Magnus C. Anderson

By Gabel & Mueller
Attys

UNITED STATES PATENT OFFICE.

MAGNUS C. ANDERSON, OF CHICAGO, ILLINOIS, ASSIGNOR TO LEE TRAILER & BODY CO., OF CHICAGO, ILLINOIS.

REAR-DUMP VEHICLE.

1,402,730. Specification of Letters Patent. Patented Jan. 10, 1922.

Application filed January 17, 1921. Serial No. 437,807.

*To all whom it may concern:*

Be it known that I, MAGNUS C. ANDERSON, a citizen of the United States, residing at Chicago, in the county of Cook and State of Illinois, have invented a certain new and useful Improvement in Rear-Dump Vehicles, of which the following is a full, clear, concise, and exact description, reference being had to the accompanying drawings, forming a part of this specification.

This invention relates to vehicles and more particularly to a rear dump vehicle provided with a rear dump rolling hopper and the hopper structure and means for mounting the rails upon which said hopper runs on the vehicle so as to provide a low center of gravity for the load in the hopper and a low dumping edge for the load.

This invention further relates to a vehicle provided with a plurality of hoppers arranged to roll rearwardly on parallel sets of rails to dumping position, and to a mounting of the rails, whereby the center of gravity of the load in said hopper is placed at a low point and a low dumping edge for the load is obtained. In a vehicle of this character it is customary to mount a framework comprising rails upon which the hoppers roll upon a motor vehicle chassis, and it is a purpose of this invention to provide a framework of such structure that the same can be mounted on a motor vehicle chassis so that the hoppers rolling thereon will dump close to the ground and so that their center of gravity when loaded will be low relative to the entire vehicle.

In mounting a framework with two sets of parallel rails on a motor vehicle chassis the total width of this framework is greater than the width of the chassis and thus extends over the rear wheels. The rear wheels of such a vehicle ordinarily extend a considerable distance above the top of the framework of the vehicle, and ordinarily it is necessary to mount the framework for the hopper structure on blocks so as to raise the same above the rear wheels so as to clear them thus raising the center of gravity of the loaded hopper to an undesirably high point.

It is a purpose of the present invention to provide a framework for supporting the rolling hoppers that extends outside the wheels without unnecessarily raising the center of gravity of the loaded hoppers by so forming the framework that the rear wheels may project upwardly through the same. This is done by providing a heavy rectangular framework, the longitudinal members of which extend laterally beyond the wheels, mounting said framework directly on the chassis and extending the cross member of the framework which ordinarily would interfere with the wheels only substantially as far as the sides of the chassis.

It is a further purpose of the invention to so construct the hopper that full benefit of this lowering of the center of gravity can be obtained. The cross member of the framework being omitted the framework can be lowered relatively to the wheels only so far that the hoppers carried on the framework will not interfere with the wheels. In order to lower the framework a maximum amount the hopper is provided with a raised bottom and the rails provided thereon that cooperate with the runway are mounted adjacent the corners of the hopper so as to provide a maximum clearance for the wheels.

It is a further object of the invention to so construct the rolling hopper that the height of the loading edge thereof is decreased without changing the width of the hopper or the general contour thereof and without changing the shape of the rails carried thereby.

It is a still further purpose of the invention to provide parallel runways each comprising an outer rail, each forming one of the longitudinal members of the framework and an inner lighter rail mounted on the cross members of said framework, one of said cross members being offset to accommodate the wheels and yet at the same time, obtain the lowest possible position for the tops of the rails forming the runway.

Other objects and advantages of the invention wil appear as the description of the accompanying drawings showing two forms that my invention may take, proceeds. However, I desire to have it distinctly understood that I do not intend to limit myself to the exact details shown and described herein but intend to include as part of my invention all such obvious changes in structure and modifications of parts as would occur to a person skilled in this art and as would fall within the scope of the claims.

In the drawings:

Fig. 1 is a fragmentary side elevational view of the rail portion of a vehicle chassis with the improved hopper and supporting structure mounted thereon;

Fig. 2 is a longitudinal vertical section of the hopper and the auxiliary framework upon which the same is adapted to roll;

Fig. 3 is a plan view of the auxiliary hopper carrying framework;

Fig. 4 is a section taken on the line 4—4, Fig. 3;

Fig. 7 is a fragmentary end elevation of the framework shown in Figs. 1 to 4 inclusive.

Figure 5:
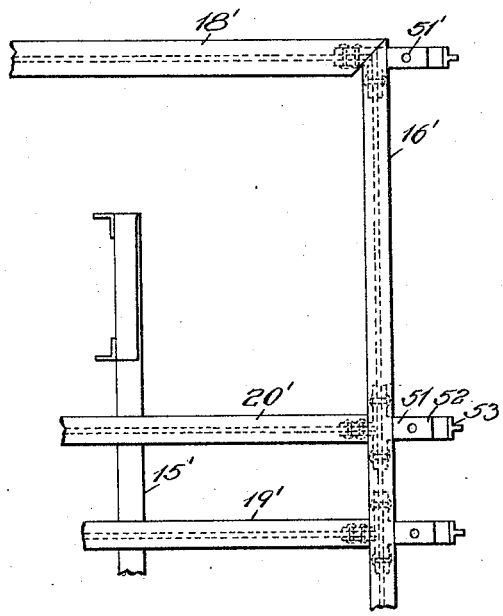
Fig. 5 is a fragmentary plan view of a modified form of framework upon which the hopper rolls.

Referring in detail to the drawings the vehicle chassis 10 is shown as having mounted thereon the auxiliary or supplemental framework 11 upon which the hopper 12 is adapted to roll from charge carrying to discharge position. The chassis 10 is shown as being that of a motor truck provided with the wheels 13 which extend above the upper side of the chassis 10 as is ordinarily the case. The supplemental framework 11 is mounted on the chassis 10 and is provided with pairs of parallel rails that serve as runways for a one-way dumping hopper that is adapted to roll on the rails from charge carrying to discharge position and to roll to charge carrying position thereon. The framework with which the runways are associated comprises the transverse members 14, 15, and 16 which rest upon the top surfaces of the vehicle framework or chassis 10 and upon which are mounted the longitudinally extending members 17 and 18 forming the sides of the framework and the intermediate longitudinally extending members 19 and 20. The members 14, 16, 17 and 18 form the main portion of the framework and are made of heavier construction than the remainder of the framework. The members 17 and 18 are each provided with a substantially straight or horizontally extending portion 21, and a downwardly inclined portion 22, and in a similar manner each of the members 19 is provided with a straight or horizontally extending portion 23, and a downwardly extending portion 24. The transverse member 15 does not extend entirely across the framework from one side member 17 to the other side member 18 but is cut off so as to provide a space sufficient to accommodate the wheels between the ends thereof and the side members 17 and 18. The two members 17 and 18 and the members 19 and 20 together form two pairs of parallel tracks, the members 17 and 19 forming one pair of tracks and the members 18 and 20 forming the other pair of tracks. These are connected together by means of the transverse members 25 and 26 at their forward ends and by the members 27 and 28 at a point spaced from the forward ends thereof. The members 25 and 27 and the members 26 and 28 are connected by means of the truss like braces 29. The member 15 rests on the framework of the vehicle and has the members 19 and 20 mounted thereon, and in order to hold this transverse member 15 in proper position relative to the remainder of the framework the longitudinal members 30 and 31 are provided which are connected to the transverse member 14 and to the member 15 at the opposite ends thereof. Each of the longitudinally extending rails is provided with the pivot hooks 32 at the rear end thereof, the upper flange of the rail member in each case projecting partially over the opening in the hook as shown at 33.

Mounted on the rails 17, 18, 19 and 20 are a pair of hoppers which are adapted to roll on these rails and each of these hoppers comprises side walls 34, a forward end wall 35 and a rear end wall 36, the top edges of the walls 34, 35 and 36 lying substantially in a plane. Mounted on the rear end portion 36 and the lower edge portions 37 of the side members 34 are the rails 38, which are adapted to cooperate with the rails on the framework as the hopper rolls along the same. The rails 38 are located substantially at the corners of the hopper where the sides 34 and the end 36 meet and are provided with outwardly curved portions 39 and with portions 40 extending parallel to the lower edges of the side members 34. The hopper is provided with a raised bottom 41 that is spaced upwardly from the bearing portion of the rails 40 a substantial distance, although not of such a degree that the center of gravity of the hopper when loaded will be altered materially from what it would be if the bottom of the hopper coincided with the contour of the rail. It will be seen that the portion of the hopper eliminated by raising the bottom 41 is of very small capacity.

By providing a raised bottom portion for the hopper the contour of the rail does not have to be varied from what has been previously found to be the most satisfactory contour thereof for proper dumping of the hopper, and yet the same provides for considerable clearance of the wheels 13 of the vehicle. It will be seen that these wheels are adapted to project between the ends of the member 15 and the side members 17 and 18 with their upper portions extending through the framework that is mounted on the vehicle framework, and between the side members 34 of the hopper, the same being spaced from the bottom member 41 only a sufficient distance to allow for the variations in the position of the wheels 13, due to the upward displacement thereof as the springs act. The position shown for the wheel in the drawings is that for normal full load, and it will be noted that sufficient clearance is provided to take care of a further deflection of the springs. The bottom of the hopper 41 is provided with a depending transversely extending member 42 that is adapted to cooperate with the member 43 extending transversely of the framework and secured to the member 15 by means of the upright angles 44 to prevent shifting of the body of the hopper 12 rearwardly on the runway.

The rails 17, 18, 19 and 20 have secured thereto the members 45 which are shaped to provide inclined abutments for the forward inclined end portion 35 of the hopper, thus preventing forward shifting of the hopper relative to the runway. Suitable means for locking the hopper in upright position or normal load carrying position is shown which comprises the hooks 46 mounted on the hopper and the transverse bail member 47 provided with the cam lever locking member 48, which bail member 47 is mounted on the rails to pivot relatively thereto.

It will be noted that the hopper has a substantially straight slightly inclined forward end member and a substantially straight inclined rear end member, which is inclined substantially at an angle of 45 degrees and a comparatively short bottom portion 41, thus providing a hopper having a long tapering overhanging portion that is adapted to roll substantially automatically to dumping position when either fully or only partially loaded, the same being capable of dumping when only loaded three-fourths full.

The hopper is provided with pivot pins 49 that are adapted to cooperate with the pivot hooks 42 to provide a final pivotal dumping movement for the hopper. The entire framework is secured to the vehicle chassis or framework 10 in any desirable manner. It will be noted that the members 19 and 20 being of lighter construction than the members 17 and 18 and mounted on top of the cross member 16, it is necessary to make provision for the difference in height between the members 17 and 18 and 19 and 20, so that the various rail members will conform throughout their length on the upper surface thereof so that the hopper will be level thereon transversely for any position of the hopper.

In order to bring the rails to the same level the transverse member 16 is offset as at 50 to accommodate the rails 19 and 20 and bring the upper surfaces thereof to the same level as the upper surfaces of the rails 17 and 18, which are secured to the transverse member 16 flush with the upper surfaces of the end portions thereof.

Figure 6:
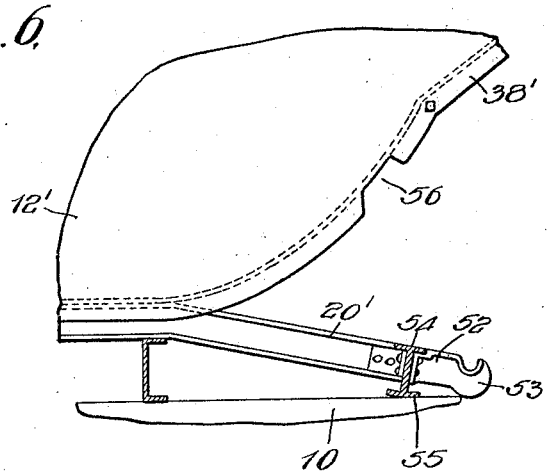
Fig. 6 is a fragmentary side elevation partly in section thereof, showing a hopper imposed thereon.

In Figs. 5 and 6 a slightly modified form of framework is shown wherein the side rails do not extend beyond the rear cross member of the framework but the corners are shown as being lighter, the side member 18' corresponding to the side member 18, Fig. 3, and the transverse member 16' corresponding to the member 16 in Fig. 3 and member 20' corresponding to member 20 in Fig. 3. In this form of the device the rail 20' and the rail 18' are flush with the transverse member 16', and the member 16' is placed nearer the extreme end portion of the runway in Figs. 1 to 4 inclusive.

In order to complete the runway and to provide for the hook members the castings 51 and 51' are provided, the castings 51' being similar to the castings 51, except that they are formed so as to be secured to a corner of the framework instead of to the side face of the web of the transverse member 16'. The castings 51 comprise a short rail portion 52 and a pivot hook member 53, the member 52 being inclined at the same angle to the horizontal as the rails 20' and 18', and the hook members being of the same construction as the hook members 32 as shown in Figs. 1 to 4 inclusive. The transverse rail 16' in the present instance has its upper surfaces 54 inclined to the horizontal so as to provide a smooth rolling surface for the hopper 12' on the runway.

In order to properly mount the transverse member 16' on the chassis 10 the lower web of the I-beam forming this member must be bent or turned up slightly as at 55 so that the transverse member 16 is inclined throughout its length. The inner rails 38' on the hopper 12' must be provided with cutout portions as at 56 to accommodate the transverse member 16, as otherwise the member 16 would interfere with the proper rolling of the hopper as it passes from the rail 20' to the bracket member or rail extension 51.

Having thus described my invention what I desire to claim and secure by U. S. Letters Patent is:

1. A device of the character described comprising a vehicle framework, wheels supporting said framework and a supplemental framework mounted on said vehicle framework, said supplemental framework comprising transverse members and longitudinal side members, each of said longitudinal members providing a rail upon the upper surface of which a hopper is adapted to roll from charge carrying to discharge position, said rail members being located laterally outwardly from said wheels and having their upper surfaces depressed below the periphery of said wheels, said wheels projecting through openings in said supplemental framework.

2. A device of the character described comprising a vehicle framework, wheels supporting said framework, and a supplemental framework mounted on said vehicle framework, said supplemental framework comprising longitudinally extending side members, and transversely extending end members connecting said side members and resting on said vehicle framework, an intermediate transverse member resting on said vehicle framework and having the ends thereof spaced from said side members to provide an opening through which said wheels are adapted to project, and means for holding said transverse member in position.

3. A device of the character described comprising a vehicle framework, wheels supporting said framework, and a supplemental framework mounted on said vehicle framework, said supplemental framework comprising longitudinally extending side members, and transversely extending end members connecting said side members and resting on said vehicle framework, an intermediate transverse member resting on said vehicle framework and having the ends thereof spaced from said side members to provide an opening through which said wheels are adapted to project, and means for holding said transverse member in position, said means comprising intermediate longitudinally extending members embodied in said framework.

4. A device of the character described comprising a vehicle framework, wheels supporting said framework, a supplemental framework mounted on said vehicle framework, said supplemental framework comprising longitudinally extending side members, transversely extending end members connecting said side members and resting on said vehicle framework, and intermediate longitudinally extending members supported by said transverse members, said longitudinally extending members providing pairs of parallel rails having the corresponding transversely aligned portions, of their upper surfaces horizontally aligned, the upper surfaces of said longitudinal and transverse members being substantially flush at the ends of said transverse members, an intermediate transverse member resting on said vehicle framework and having the ends thereof spaced from said side members to provide an opening through which said wheels are adapted to project, and means for holding said transverse member in position, and a hopper adapted to roll on each of said pairs of rails from charge carrying to discharge position.

5. A device of the character described comprising a vehicle framework, wheels supporting said framework, a supplemental framework mounted on said vehicle framework, said supplemental framework comprising longitudinally extending side members, transversely extending end members connecting said side members and resting on said vehicle framework, and intermediate longitudinally extending members supported by said transverse members, said longitudinally extending members having a flat portion and an inclined portion providing pairs of parallel rails having the upper surfaces of said flat and inclined portions extending in the same planes, the upper surfaces of said longitudinal and transverse members being substantially flush at the ends of said transverse members, an intermediate transverse member resting on said vehicle framework and having the ends thereof spaced from said side members to provide an opening through which said wheels are adapted to project, and means for holding said transverse member in position, and a hopper adapted to roll on each of said pairs of rails from charge carrying to discharge position.

6. The combination with a vehicle framework and wheels supporting said framework, of a supplemental framework mounted on said vehicle framework, said supplemental framework being provided with openings through which said wheels project, the upper surface of said framework forming a runway and a one-way dumping hopper adapted to roll on said runway from charge carrying to discharge position, said hopper being provided with side walls and end walls, rails carried by said hopper adapted to cooperate with said runway, said hopper having a bottom raised above the lower edges of said side walls providing a recess into which said wheels project.

7. A supplemental vehicle framework comprising longitudinally extending side members and transversely extending end members connecting said side members, said members forming a rectangular framework, and intermediate longitudinally extending members, said longitudinally extending members providing pairs of parallel rails having straight portions and inclined portions with their upper surfaces in horizontal transverse alignment throughout their length, said longitudinal members and one of said end members having their upper surfaces flush, and rail extensions secured to said last mentioned end members, said extensions projecting rearwardly beyond said rectangular framework and having pivot hooks formed integral therewith.

8. A supplemental vehicle framework comprising longitudinally extending side members and transversely extending end members connecting said side members, said members forming a rectangular framework, and intermediate longitudinally extending members, said longitudinally extending members providing pairs of parallel rails having straight portions and inclined portal transverse alignment throughout their length, said longitudinal members and one of said end members having their upper surfaces flush, rail extensions secured to said last mentioned end member, said extensions projecting rearwardly beyond said rectangular framework and having pivot hooks formed integral therewith, and a hopper provided with rail members adapted to engage with a pair of said rails on said framework to guide said hopper as it rolls thereon, one of said rail members being provided with a cut out portion intermediate its ends to accommodate said end member as said hopper rolls onto said extensions.

9. A supplemental vehicle framework comprising longitudinally extending side members, front and rear cross members, and intermediate longitudinally extending members, said rear cross member being provided with an offset portion to receive said intermediate longitudinally extending members.

In witness whereof, I hereunto subscribe my name this 3rd day of January A. D., 1921.

MAGNUS C. ANDERSON.